US010657965B2

(12) United States Patent
Reily et al.

(10) Patent No.: US 10,657,965 B2
(45) Date of Patent: May 19, 2020

(54) CONVERSATIONAL AUDIO ASSISTANT

(71) Applicant: Bose Corporation, Framingham, MA (US)

(72) Inventors: Todd Richard Reily, North Reading, MA (US); Keith Dana Martin, Westborough, MA (US); Christine M. Hostage, Southborough, MA (US); Lya Batlle-Rafferty, Hopkinton, MA (US); Conor William Sheehan, Natick, MA (US); Joseph M. Geiger, Clinton, MA (US); Elio Dante Querze, Arlington, MA (US); Ruben M. Carbonell, Northbridge, MA (US); Curtis Bard, Waltham, MA (US); Saurabh Khanwalkar, Newton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/048,631

(22) Filed: Jul. 30, 2018

(65) Prior Publication Data
US 2019/0035397 A1 Jan. 31, 2019

Related U.S. Application Data

(60) Provisional application No. 62/538,853, filed on Jul. 31, 2017.

(51) Int. Cl.
G10L 15/18 (2013.01)
G10L 15/30 (2013.01)
(Continued)

(52) U.S. Cl.
CPC ............ G10L 15/22 (2013.01); G06F 3/165 (2013.01); G06F 3/167 (2013.01); G06F 16/632 (2019.01);
(Continued)

(58) Field of Classification Search
CPC ..... G10L 15/1815; G10L 15/22; G10L 15/30; G10L 2015/223; G06F 17/2765;
(Continued)

(56) References Cited

U.S. PATENT DOCUMENTS 9,560,451 B2 * 1/2017 Eichfeld ................ H04R 5/027
2009/0013260 A1 1/2009 Martin et al.
(Continued)

FOREIGN PATENT DOCUMENTS

WO 2008042242 A2 4/2008

OTHER PUBLICATIONS

International Search Report and Written Opinion for International Application No. PCT/US2018/044402, dated Oct. 29, 2018, 14 pages.

Primary Examiner — Akwasi M Sarpong
(74) Attorney, Agent, or Firm — Hoffman Warnick LLC

(57) ABSTRACT

Various implementations include audio systems for controlling audio feedback to user requests. In some particular cases, a headphone system includes at least one headphone including an acoustic transducer having a sound-radiating surface for providing an audio output; at least one microphone for receiving an audio input from a user; and a control system including a recommendation engine, the control system coupled with the at least one headphone and the at least one microphone, the recommendation engine configured to: analyze the audio input for a non-specific request from the user; and provide an audio sample to the user along with a prompt for feedback about the audio sample in response to the non-specific request.

18 Claims, 4 Drawing Sheets

(51) Int. Cl.
*G06F 40/279* (2020.01)
*G10L 15/22* (2006.01)
*G06F 3/16* (2006.01)
*G06F 16/635* (2019.01)
*G06F 16/632* (2019.01)
*G06F 40/35* (2020.01)
*G06F 16/638* (2019.01)

(52) U.S. Cl.
CPC .......... *G06F 16/635* (2019.01); *G06F 40/279* (2020.01); *G06F 40/35* (2020.01); *G10L 15/1815* (2013.01); *G10L 15/30* (2013.01); *G06F 16/638* (2019.01); *G10L 2015/223* (2013.01)

(58) Field of Classification Search
CPC ...... G06F 17/279; G06F 16/635; G06F 3/165; G06F 3/167; G06F 16/632; G06F 16/638

USPC ....................................................... 704/257
See application file for complete search history.

(56) References Cited

U.S. PATENT DOCUMENTS

| | | | |
|---|---|---|---|
| 2011/0040707 A1* | 2/2011 | Theisen ............... | G11B 27/105 706/12 |
| 2011/0112921 A1* | 5/2011 | Kennewick ........ | G06Q 30/0601 705/26.1 |
| 2014/0245155 A1* | 8/2014 | Jeon ..................... | H04M 1/7253 715/728 |
| 2015/0371529 A1* | 12/2015 | Dolecki ................ | G08C 17/02 700/94 |
| 2017/0098466 A1* | 4/2017 | Elliot .................... | H04J 3/0641 |
| 2018/0213009 A1* | 7/2018 | Segal ..................... | H04L 67/22 |
| 2018/0261216 A1* | 9/2018 | Leeb .................. | G10L 15/1815 |

* cited by examiner

CONVERSATIONAL AUDIO ASSISTANT

PRIORITY CLAIM

This application claims priority to U.S. Provisional Patent Application 62/538,853, filed on Jul. 31, 2017, the entire contents of which are incorporated here by reference.

TECHNICAL FIELD

This disclosure generally relates to audio systems. More particularly, the disclosure relates to controlling audio streams using conversational voice commands.

BACKGROUND

Voice-controlled systems are becoming more commonplace. However, the user experience with these voice-controlled systems is often hindered by miscommunication between the user and the system.

SUMMARY

All examples and features mentioned below can be combined in any technically possible way.

Various implementations include audio systems for controlling audio feedback to user requests. In some implementations, these audio systems include headphone systems. In other implementations, these audio systems include speaker systems. In still further implementations, a computer-implemented method is disclosed for controlling an audio system.

In some particular aspects, a headphone system includes: at least one headphone including an acoustic transducer having a sound-radiating surface for providing an audio output; at least one microphone for receiving an audio input from a user; and a control system including a recommendation engine, the control system coupled with the at least one headphone and the at least one microphone, the recommendation engine configured to: analyze the audio input for a non-specific request from the user; and provide an audio sample to the user along with a prompt for feedback about the audio sample in response to the non-specific request.

In another aspect, a speaker system includes: at least one speaker including an acoustic transducer having a sound-radiating surface for providing an audio output; at least one microphone for receiving an audio input from a user; and a control system including a recommendation engine, the control system coupled with the at least one speaker and the at least one microphone, the recommendation engine configured to: analyze the audio input for a non-specific request from the user; and provide an audio sample to the user along with a prompt for feedback about the audio sample in response to the non-specific request.

In another aspect, a computer-implemented method of controlling an audio system configured to provide an audio output includes: analyzing an audio input for a non-specific request from a user; and providing an audio sample to the user along with a prompt for feedback about the audio sample in response to the non-specific request.

Implementations may include one of the following features, or any combination thereof.

In some implementations, the non-specific request includes at least one syntactically ambiguous clause. In certain implementations, the non-specific request includes a request to play a style of music or an open-ended query for a music recommendation.

In some cases, the recommendation engine is further configured to: receive negative feedback from the user about the audio sample; and provide an additional audio sample to the user along with an additional prompt for feedback about the additional audio sample in response to receiving the negative feedback. In certain implementations, the negative feedback includes an audio input from the user or a response to an interface prompt.

In some implementations, the recommendation engine is further configured to: receive positive feedback from the user about the audio sample; and continue an audio feed of the audio sample in response to receiving the positive feedback from the user about the audio sample. In certain implementations, the positive feedback includes an audio input from the user, a response to an interface prompt or a null response.

In some cases, the prompt for feedback is provided to the user without an intervening audio input prompt from the user.

In certain implementations, the control system maintains the at least one microphone in a query mode during the providing of the audio sample.

In some implementations, the recommendation engine is further coupled with a profile system including a user profile for the user, and the recommendation engine is further configured to determine a type of the audio sample based upon the user profile. In certain implementations, the profile system is located in one of a local server or a cloud-based server.

In some cases, the audio sample is provided through the at least one headphone at a decibel level ranging between approximately 50-70 decibels (dB). In certain implementations, the prompt is provided at an approximately equal or greater volume to the user than the audio sample.

In some implementations, the audio system further includes a sensor system coupled with the control system, the sensor system configured to detect an environmental condition proximate the at least one headphone, where the recommendation engine is further configured to: receive data about the environmental condition from the sensor system; and determine a type of the audio sample based at least in part upon the environmental condition.

In certain cases, the recommendation engine further selects the audio sample based upon at least one of: a syntax of the non-specific request from the user, a profile of the user, a demographic profile of a plurality of users with at least one common attribute with the user or a categorical popularity of the audio sample.

In some cases, the recommendation engine is further configured to provide an explanation for selection of the audio sample in response to receiving one of positive feedback from the user about the audio sample or negative feedback from the user about the audio sample.

In certain implementations, the non-specific request includes a request for an audio output associated with at least one other user, and the recommendation engine selects the audio sample based upon profile data or activity data about the at least one other user. In some cases, the user profile data includes demographic data about the at least one other user, and the activity data includes audio preferences associated with the at least one other user.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

Figure 1:
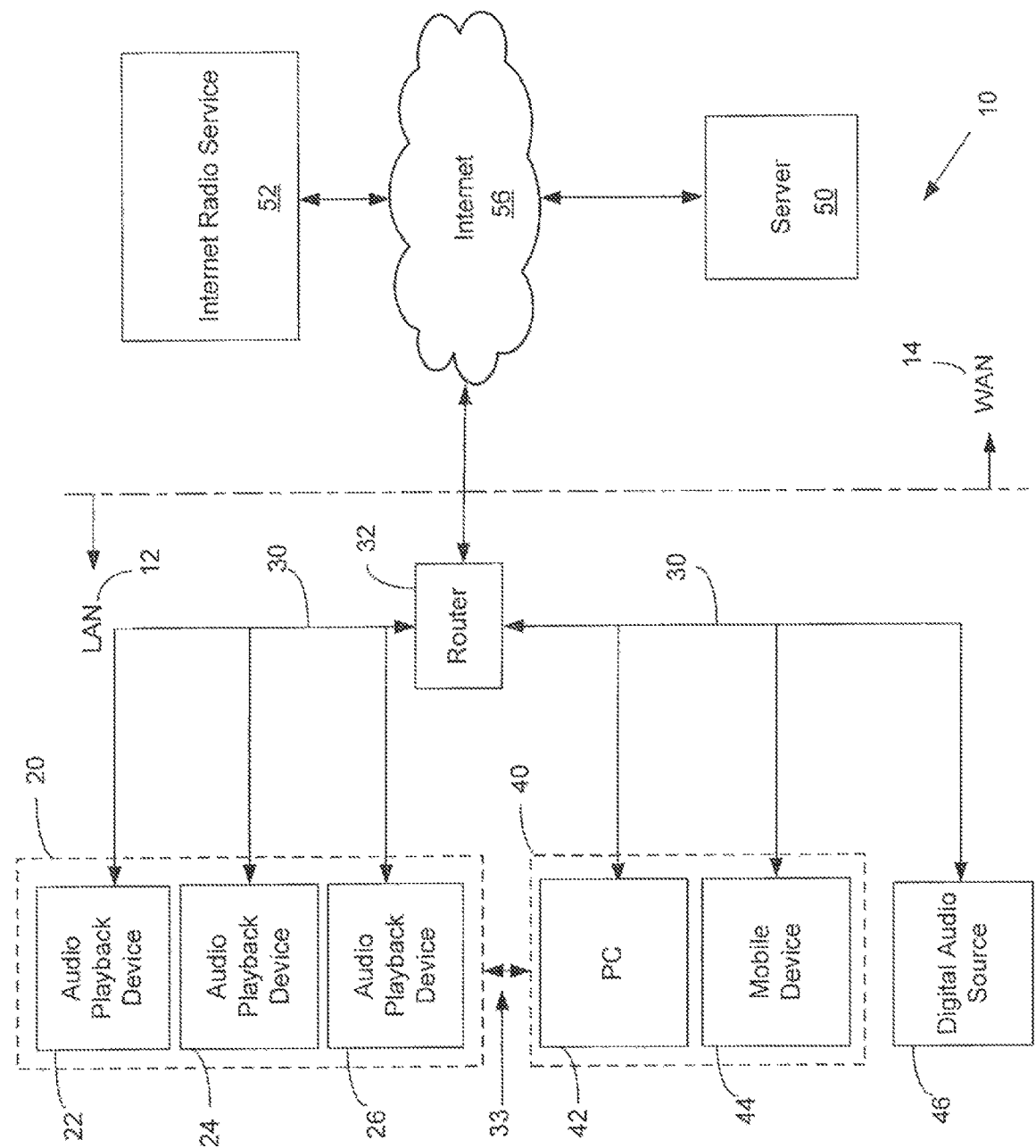
FIG. 1 is a schematic block diagram of an audio distribution system that can be used according to various particular implementations, including an audio source and a wireless speaker package.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an audio control system can be beneficially incorporated into an audio system to provide for added functionality. For example, an audio control system can help to enable, among other things, conversational voice control functionality, predictive playback functionality, and enhanced responses to voice commands for audio playback.

Commonly labeled components in the FIGURES are considered to be substantially equivalent components for the purposes of illustration, and redundant discussion of those components is omitted for clarity.

System Overview

FIG. 1 shows a schematic depiction of an audio distribution system 10, which can be used to accomplish conversational audio functions described according to various implementations. FIG. 1 also includes non-limiting examples of wireless speaker packages and other wireless audio sources and sinks that can be involved in these conversational audio control approaches. System 10 is adapted to deliver digital audio (e.g., digital music). System 10 includes a number of audio playback devices 22, 24 and 26 which are among the group of audio output devices 20 of the system. In one non-limiting implementation, the audio playback devices include speaker packages (e.g., wireless speaker packages) with one or more speakers, which can include a digital to analog converter that is able to receive digital audio signals and convert them to analog form. The speaker packages can also include an electro-acoustic transducer that receives the analog audio signals and transduces them into sound. The speaker packages can also include one or more microphones for receiving audio inputs from a user. The speaker packages can also include a processor. The speaker packages can be connected to one another and also connected to the router/access point 32 via network 30. The speaker packages are thus able to communicate with one another. Network 30 can be a wired and/or wireless network, and can use known network connectivity methodologies. Network 30 is part of local area network (LAN) 12 which is connected to wide area network (WAN) 14, in this non-limiting example by connection to Internet 56. LAN 12 also includes one or more separate computing devices 40 and/or one or more separate local digital audio sources 46. In this non-limiting example, the computing devices include a personal computer 42 and a mobile computing device 44 such as a smartphone, tablet, wearable electronic device (e.g., headphone system, earpiece, smart glasses) or the like. One or more of the computing devices 40 may be connected to one or more of audio output devices 20 by a personal area network (PAN) 33 (e.g., a wireless PAN). PAN 33 may comprise a direct point-to-point Bluetooth connection between mobile device 44 and one of the audio playback devices 22, 24 or 26. WAN 14 includes server 50 and Internet radio service 52 which can both communicate with LAN 12 via Internet 56.

One use of system 10 is to play an audio stream over one or more of the audio playback devices in group 20 according to one or more conversational audio commands from a user. The sources of digital audio provide access to content such as audio streams that move over network 30 and/or network 33 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora® (a radio station provided by Pandora Media, Inc. of Oakland, Calif., USA), Spotify® (provided by Spotify USA, Inc., of New York, N.Y., USA) and vTuner® (provided by vTuner.com of New York, N.Y., USA), for example. Network attached storage devices such as digital audio source 46, and media server applications such as may be found on a mobile computing device, can also be sources of audio data. In some example embodiments, the user selects the audio source and the playback devices via PC 42 and/or mobile device 44.

Example Playback Device

Figure 2:
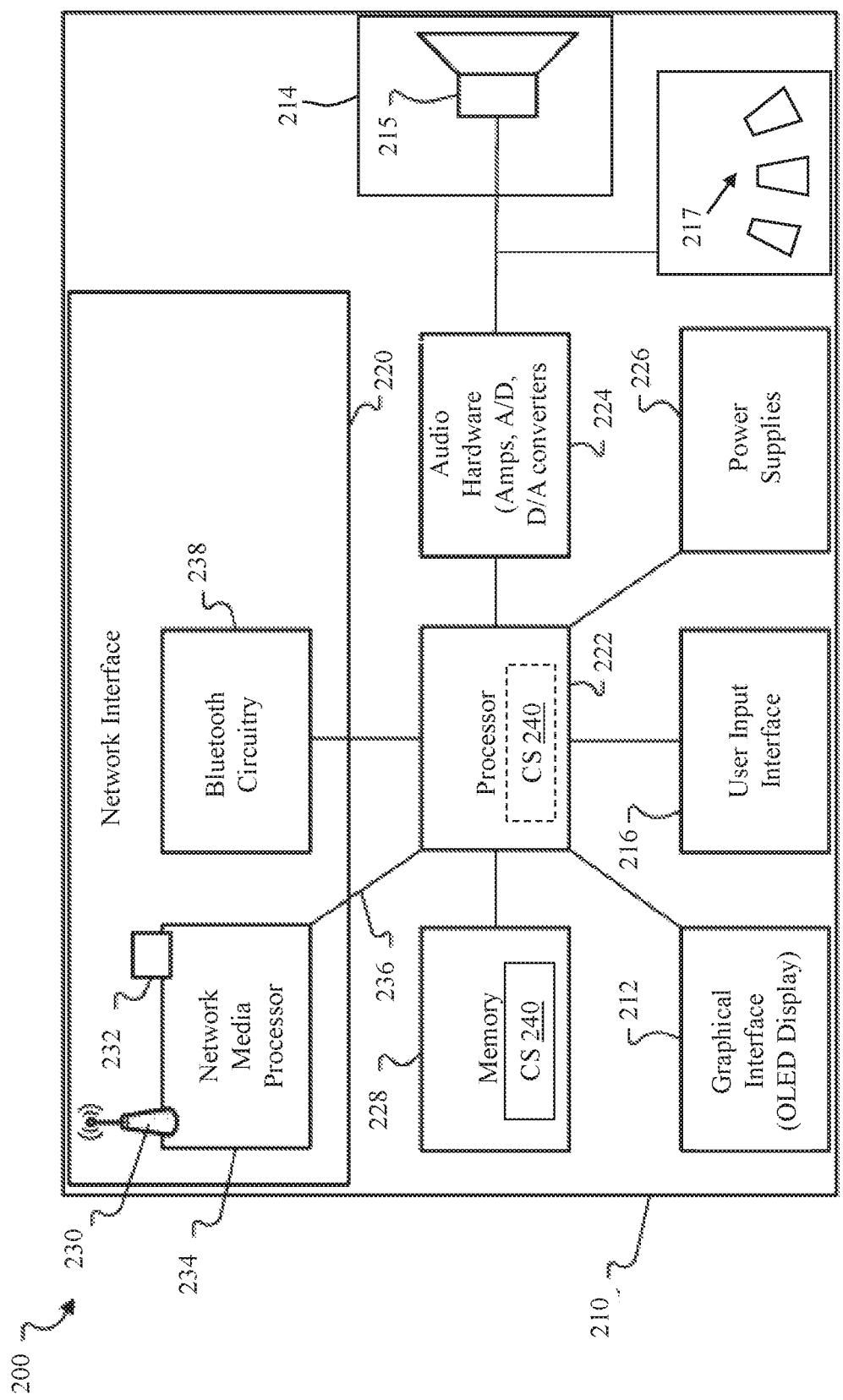
FIG. 2 is a block diagram of an example audio playback device, including a wireless speaker package, according to various particular implementations.

FIG. 2 illustrates an example audio playback device 22, 24, 26 (FIG. 1) in the form of a speaker package 200 according to various particular implementations of the disclosure. In various implementations, speaker package 200 includes a wireless speaker package, such as a speaker configuration in a wireless speaker system. However, in other implementations, speaker package can form part of a headphone system and/or an integrated headphone/speaker/control system, such as a home, automobile, office or other integrated audio system whereby one or more audio playback devices 22, 24, 26 communication with one another and/or computing devices 40 (FIG. 1) as described herein. In some implementations, speaker package 200 includes an enclosure 210, such as a casing or other hardware. Enclosure 210 can include a speaker housing, or may include a headphone casing such as one found in an over-ear, on-ear or in-ear (e.g., earbud) headphone configuration. In some implementations, the enclosure 210 includes a graphical interface 212 (e.g., an OLED display) which can provide the user with information regarding currently playing (e.g., "Now Playing") music. It is understood that according to various additional implementations, the graphical interface 212 could be located on a distinct device (e.g., a linked computing device 40 or audio playback device 22, 24, 26, FIG. 1). Speaker package 200 can also include a speaker 214 including at least one electro-acoustic transducer 215. Additionally, speaker package 200 can include at least one microphone 217 (a plurality shown) for receiving an audio input from a user, e.g., a voice command from a human or other user (such as a robotic or machine user).

It is understood that speaker 214 and/or microphone 217, as well as other components of speaker package 200, can be incorporated in physical devices that are separate from enclosure 210, and may be physically separated from one another. That is, according to various implementations, speaker 214 and/or microphone 217 are configured to communicate wirelessly and/or via hard-wired means with control components (e.g., processor, memory) of this example speaker package 200 to perform conversational audio control functions as described herein. In one particular example, speaker 214 could be incorporated within any headphone device configured to provide sound proximate a user's ear, e.g., an over-ear headphone, an in-ear headphone (or earbud), a head-mounted audio system, a noise-reduction headphone system (e.g., active noise reduction or passive noise reduction system), while microphone(s) 217 could be located within any device configured to receive audio commands from a user, e.g., a wearable smart device (e.g., smart watch, smart glasses), a smart phone, a remote control device or a stationary speaker system.

Speaker package 200 can also include a user input interface 216. The user input interface 216 can include a plurality of preset indicators, which can be hardware buttons, software buttons (e.g., touch-screen buttons) or other viewable and/or actuatable indicators for controlling audio playback according to various particular implementations. In some cases, the preset indicators can provide the user with easy, one-press access to entities assigned to those buttons. In this example, the assigned entities can be associated with different ones of the digital audio sources such that a single wireless speaker package 200 can provide for single press access to various different digital audio sources. As with graphical interface 212, user input interface 216 could be located on a distinct device (e.g., a linked computing device 40 or audio playback device 22, 24, 26, FIG. 1), and need not be physically incorporated in enclosure 210.

Speaker package 200 can also include a network interface 220, a processor 222, audio hardware 224, power supplies 226 for powering the various components, and a memory 228. Each of the processor 222, the graphical interface 212, the network interface 220, the audio hardware 224, the power supplies 226, and the memory 228 can be interconnected using various buses, and several of the components may be mounted on a common motherboard or in other manners as appropriate.

The network interface 220 can provide for communication between the speaker package 200, audio sources and/or other networked (e.g., wireless) speaker packages and/or other audio playback devices via one or more communications protocols. The network interface 220 may provide either or both of a wireless interface 230 and a wired interface 232. The wireless interface 230 allows the speaker package 200 to communicate wirelessly with other devices in accordance with a communication protocol such as IEEE 802.11 b/g. The wired interface 232 provides network interface functions via a wired (e.g., Ethernet) connection.

In some cases, the network interface 220 may also include a network media processor 234 for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services. For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device.

Other digital audio coming from network packets may come straight from the network media processor 234 through a USB bridge 236 to the processor 222 and runs into the decoders, DSP, and eventually is played back (rendered) via the electro-acoustic transducer(s) 215.

The network interface 220 can also include Bluetooth circuitry 238 for Bluetooth applications (e.g., for wireless communication with a Bluetooth enabled audio source such as a smartphone or tablet).

In operation, streamed data can pass from the network interface 220 to the processor 222. The processor 222 can execute instructions within the speaker package 200 (e.g., for performing, among other things, digital signal processing, decoding, and equalization functions), including instructions stored in the memory 228. The processor 222 may be implemented as a chipset of chips that include separate and multiple analog and digital processors. The processor 222 may provide, for example, for coordination of other components of the speaker package (i.e., audio playback device) 200, such as control of user interfaces, applications run by the speaker package (i.e., audio playback device) 200.

The processor 222 can provide a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215, which each include a sound-radiating surface for providing an audio output for playback. In addition, the audio hardware 224 may include circuitry for processing analog input signals to provide digital audio signals for sharing with other devices.

The memory 228 may include, for example, flash memory and/or non-volatile random access memory (NVRAM). In some implementations, instructions (e.g., software) are stored in an information carrier. The instructions, when executed by one or more processing devices (e.g., the processor 222), perform one or more processes, such as those described elsewhere herein. The instructions can also be stored by one or more storage devices, such as one or more (e.g. non-transitory) computer- or machine-readable mediums (for example, the memory 228, or memory on the processor). As described herein, memory 228 and/or processor 222 (e.g., memory on the processor) can include a control system 240 including instructions for controlling conversational audio functions according to various particular implementations. Control system 240 is shown in both locations (processor location in phantom) to illustrate that one or more portions of control system 240 instructions may be stored on memory 228 and/or processor 222. It is understood that portions of control system 240 (e.g., instructions) could also be stored in a remote location or in a distributed location, and could be fetched or otherwise obtained by the speaker package 200 (e.g., via any communications protocol described herein) for execution by processor 222. The instructions may include instructions for controlling conversational audio processes (i.e., the software modules include logic for processing audio inputs from a user to manage audio streams), as well as digital signal processing and equalization. Additional details may be found in U.S. Patent Application Publication 2014/0277644, U.S. Patent Application Publication 20170098466, U.S. Patent Application Publication 20140277639, and U.S. Patent Application No. 62/538,849 ("Adaptive Headphone System," filed concurrently herewith), the disclosures of which is incorporated herein by reference in their entirety.

Conversational Audio

According to various implementations, system 10, which may include audio playback devices 22, 24, 26 (e.g., including speaker package 200), can be configured to provide conversational-based audio recommendations from user audio inputs. These particular implementations can allow a user to provide conversation-style voice commands, e.g., non-specific data requests, and receive tailored audio responses including recommendations and/or feedback for further refining results. These implementations can enhance the user experience in comparison to conventional voice-controlled audio systems.

As noted herein, with reference to the example audio playback device of FIG. 2, it is understood that one or more components in the speaker package 200 may be housed separately from one another, such as in the case of a headphone system paired with a smartwatch or smart glasses, or a speaker system paired with a voice recognition controller. It is understood that other audio playback devices 22, 24, 26 (FIG. 1) described herein can have similar capabilities speaker package 200, e.g., may include one or more microphones 217 and/or speakers 214 for aiding in conversational audio processes.

As further noted herein, in some cases, where speaker package 200 includes a headphone system, speaker 214 can include or be incorporated within any headphone device configured to provide sound proximate a user's ear, e.g., an over-ear headphone, an in-ear headphone (or earbud), a head-mounted audio system, a noise-reduction headphone system (e.g., active noise reduction or passive noise reduction system). In other implementations, where speaker package 200 includes a speaker system, speaker 214 can include any conventional speaker hardware including stand-along speaker devices, distributed speaker systems, and/or any wireless or hardwired speaker system.

Figure 3:
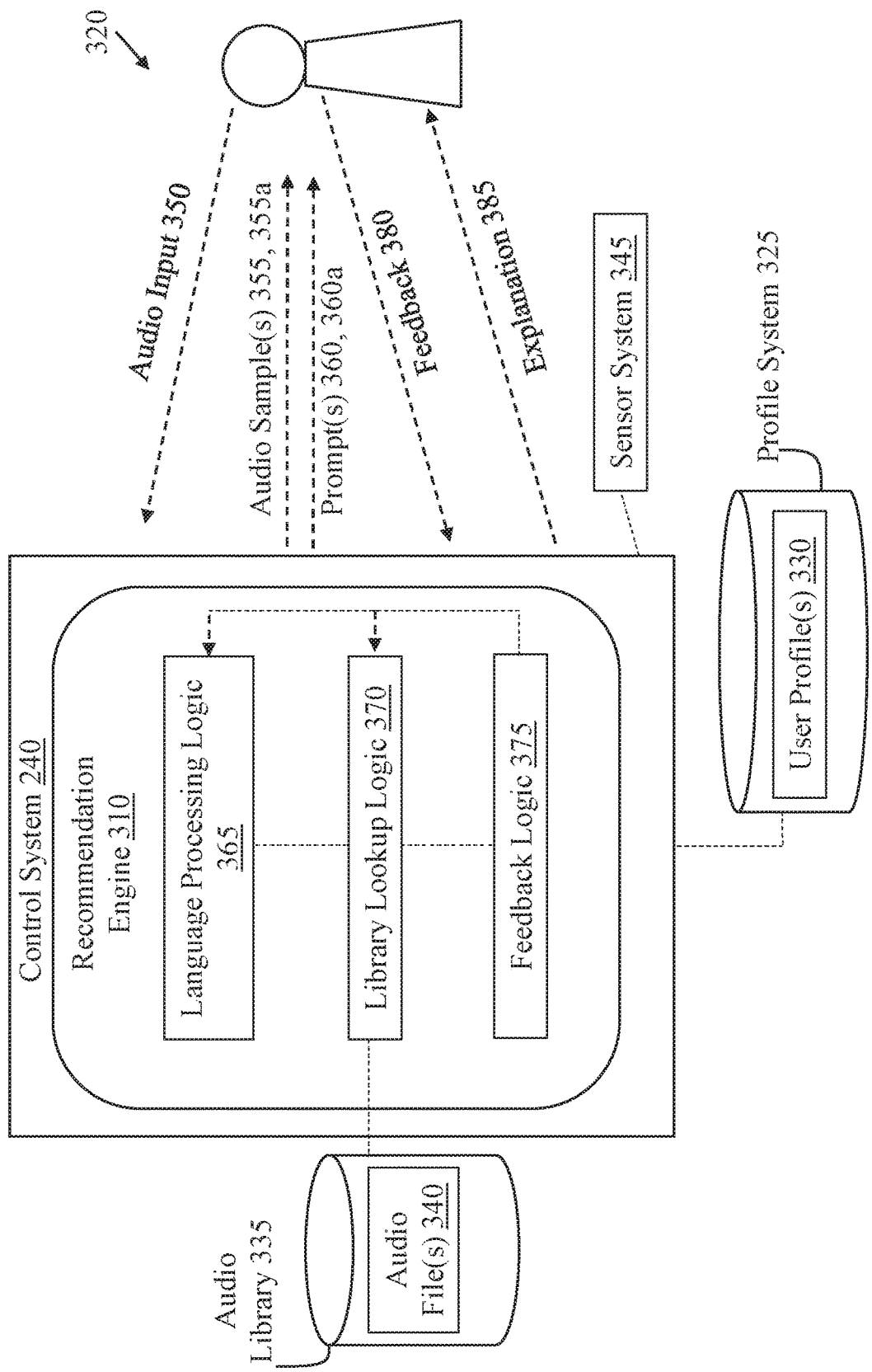
FIG. 3 shows a schematic data flow diagram illustrating a control process performed by a recommendation engine in the audio system of FIG. 2, according to various particular implementations.
Figure 4:
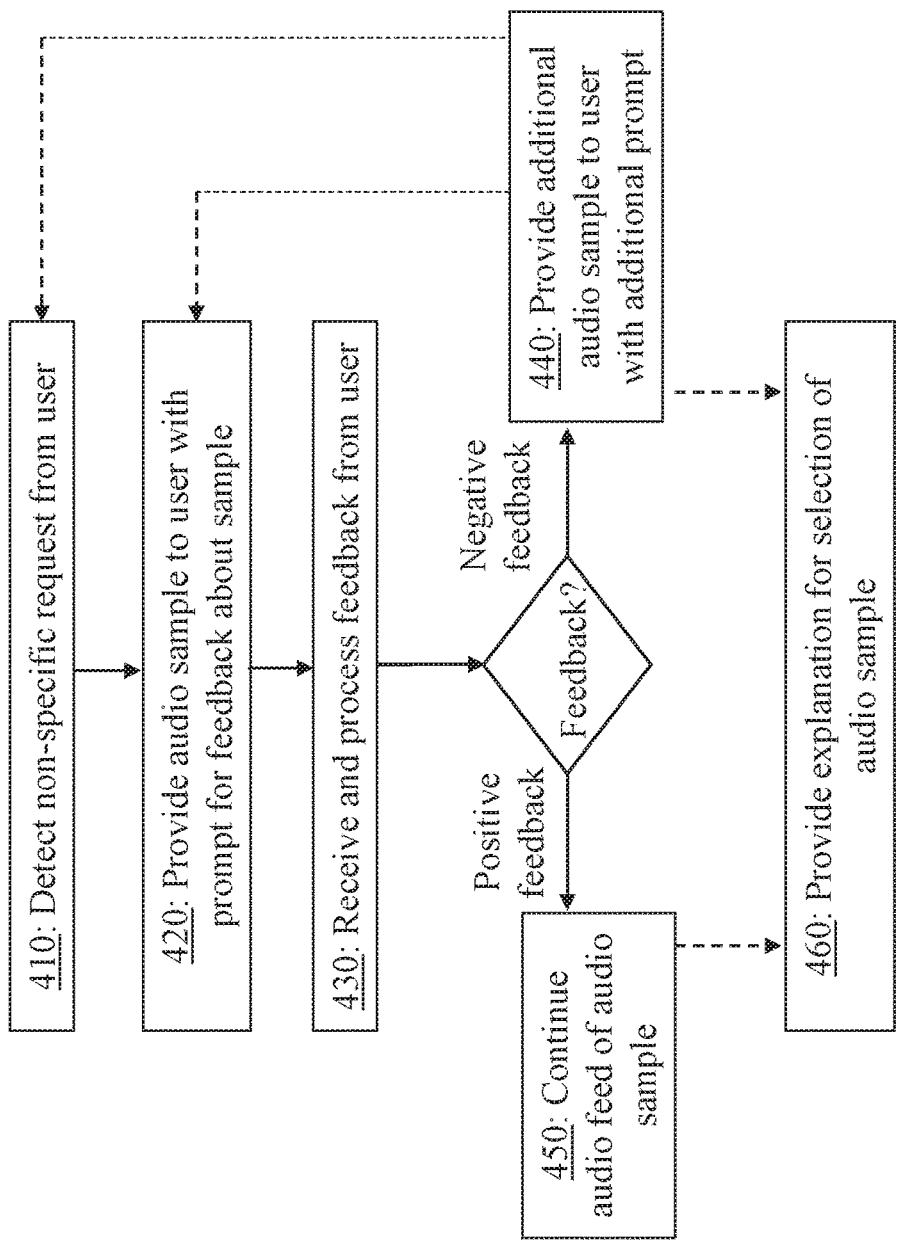
FIG. 4 shows a process flow diagram illustrating processes performed by the recommendation engine shown in FIG. 3.

FIG. 3 shows a schematic data flow diagram illustrating a control process performed by processing instructions stored in control system 240 (FIG. 2). That is, FIG. 3 illustrates a data flow diagram illustrating processes performed by a recommendation engine 310 stored within control system 240. Recommendation engine 310 can include hardware and/or software instructions for execution by processor 222 (FIG. 2), which can control conversational audio processes in connection with a user 320. It is understood that user 320 can include a human user or any user capable of providing a non-specific audio request for processing by recommendation engine 310. That is, user 320 could include a robotic or augmented voice-based system capable of providing a non-specific audio request. FIG. 4 shows a process flow diagram illustrating processes performed by recommendation engine 310 according to various implementations. FIGS. 2-4 are referred to simultaneously, with particular emphasis on FIGS. 3 and 4.

FIG. 3 shows control system 240, including recommendation engine 310, coupled with a profile system 325 for storing user profiles 330, an audio library 335 including audio files 340 for playback, and a sensor system 345 for detecting conditions proximate user 320. These components can be coupled via any conventional hard-wired and/or wireless connection, or via any other connection described herein. Additional features of these components are described with respect to data flows between those components in FIG. 4.

According to various implementations, recommendation engine 310 is configured to receive an audio input 350 (via audio hardware 224, FIG. 2) from the user 320. As described herein, an audio input 350 can include any verbal command, comment or phrase from user 320. In various implementations, processor 222 (FIG. 2), by executing instructions such as instructions from recommendation engine 310, is configured to receive the audio input 350 as an audio file, and run the recorded audio through a speech recognition algorithm in order to associate the recorded audio with a command. Processor 222 can then execute the command. The recorded audio may be a command to play content from a particular music genre or artist. For example, the recorded audio may be "Play Rush," which the audio playback device would associate with a command to play audio content by artist Rush. In response, the audio playback device 22, 24, 26 (FIG. 1), including, e.g., the control system 240, identifies a source (and an associated entity) to provide streamed audio content that is pertinent to the command. This may begin with a search of content available on the user's LAN, and, if the search of the local content does not produce results, then the audio playback device 22, 24, 26 (FIG. 1) can extend the search to remote audio sources (e.g., internet radio service(s) 52, FIG. 1). Once a source with an appropriate entity for providing relevant content is identified, the audio playback device 22, 24, 26 (FIG. 1) can request streamed audio content from the source. The request could, for example, include or consist of an identification of a URL for an entity (e.g., a radio stream). In some cases, the audio playback device 22, 24, 26 (FIG. 1) may use the name of the requested artist or a requested song to seed a personal radio station via an automated music recommendation service, such as Pandora® Radio. The source may receive the request, and, in response, provide (e.g., stream) the requested audio content to the audio playback device 22, 24, 26 (FIG. 1). The audio playback device 22, 24, 26 (FIG. 1) receives the streamed audio content and the audio playback device 22, 24, 26 (FIG. 1) provides (i.e., renders) the audio content which is relevant to the user's command, e.g., to the speaker 214 in speaker package 200 (FIG. 2).

In various particular implementations, recommendation engine 310 is configured (e.g., programmed) to analyze the audio input 350 for a non-specific request from user 320 (process 410, FIG. 4), and provide an audio sample 355 to the user 320 along with a prompt 360 for feedback about the audio sample 355 in response to detecting the non-specific request (process 420, FIG. 4). In particular, recommendation engine 310 can include language processing logic 365 for processing the audio input 350, including detecting a non-specific request from the user 320, along with analyzing the non-specific request for keywords, phrases, syntax pairings, contradictions, etc. Language processing logic 365 can include voice-to-text functions, natural language processing functions, syntax analysis functions, etc. Language processing logic 365 can be configured to parse the audio input 350 into keywords, phrases or clauses, and analyze the parsed audio input 350 for particular weighting or preferences based upon, e.g., a user profile 330 for user 320. In some cases, audio input 350 includes an audio signal, and may be analyzed using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, audio files 340 can include "text" metadata, which can allow recommendation engine 310 to perform metadata feature extraction on audio file(s) 340. This metadata feature extraction can include, for example, matching and linking features to a database (e.g., audio library 335) and/or retrieving/analyzing additional audio and semantic attributes of the audio file(s) 340, e.g., genre, mood, themes or related artists. Recommendation engine 310 (and logic therein) can use these acoustic features from audio input 350 and metadata features from audio files 340 to perform statistical and probabilistic modeling in order to recommend other similar audio file(s) 340 and/or recommend audio streams (e.g., radio stations, albums, playlists or artists).

User profile 330 may be user-specific, community-specific, device-specific, location-specific or otherwise associated with a particular entity such as user 320. In some cases, user profile 330 is stored in a profile system 325 which is coupled with recommendation engine 310 (e.g., via hardwired and/or wireless connection). In some cases, profile system 325 is located in a local server or a cloud-based server, similar to any such server described herein. User profile 330 may include information about frequently played audio files associated with user 320 or other similar users (e.g., those with common audio file listening histories, demographic traits or Internet browsing histories), "liked" or otherwise favored audio files associated with user 320 or other similar users, frequency with which particular audio files are changed by user 320 or other similar users, etc. Language processing logic 365 can parse the command in audio input 350 to identify key words, phrases, clauses, along with weighting and preferences using the user profile 330 and other readily available data, e.g., a demographic profile of a plurality of users with at least one common attribute with the user or a categorical popularity of the audio sample.

Some other implementations of recommendation engine 310 can rely at least partially upon a non-specific request for an audio output (audio sample 355) associated with at least one other user. In these cases, recommendation engine 310 can select the audio sample 355 based upon profile data or activity data about other user(s). In various implementations, this profile data or activity data can be stored or otherwise accessible through user profile(s) 330. In some cases, the user profile data includes demographic data about the at least one other user, and the activity data includes audio preferences associated with the at least one other user. For example, user 320 may be grouped or otherwise categorized with other users, such as those subscribed to the audio library 335 or to any other digital audio source 46 (FIG. 1) described herein. In some cases, the other user may be part of a social network related to user 320, and can be recognized by a voice command or other user interface command from user 320 for an audio output associated with that other user (e.g., "play music Sam likes").

According to particular implementations, recommendation engine 310 can be additionally connected with sensor system 345 (via control system 240) that is configured to detect an environmental condition proximate the at least one speaker 214 (FIG. 2). Environmental conditions, as described herein, can include at least one of: a location of the at least one speaker 214 (e.g., as detected by location-based detection systems such as global positioning system (GPS) location systems, Wi-Fi location systems, infra-red location systems, Bluetooth beacon systems, etc.), an acceleration of the at least one speaker 214 or a deceleration of the at least one speaker 214 (e.g., as detected by an accelerometer or gyroscope), or ambient audio signals proximate the at least one speaker 214 (as detected by microphone(s) 217). In some implementations, sensor system 345 could additionally include an audio sensor (e.g., one or more additional microphones or arrays for detecting environmental conditions) and/or a visual sensor (e.g., a camera vision system). In these implementations, recommendation engine 310, and in particular, language processing logic 365, is configured to rely at least partially upon sensor data gathered from sensor system 345 in weighting words, phrases, clauses, etc. from the non-specific request. For example, sensor data can be used as contextual cues to support natural language or other language-based understanding, dialog strategy, audio (e.g., music) recommendation intelligence, environmental understanding, embodied character animations and/or mimicry, and/or other behavioral intelligence. Additionally, sensor data from sensor system 345 can be stored as a history for one or more users 320. In some implementations, recommendation engine 310 can be configured (e.g., programmed) to utilize sensor data, such as contextual information, along with a logic model (e.g., rule-based model or statistical model) to initiate particular dialog actions, audio (e.g., music) actions and proactive behavior. Some additional implementations can use sensor repositioning (e.g., repositioning of one or more sensors in sensor system 345) to gather data about user 320 and the surrounding environment to aid recommendation engine 310 in selecting audio samples 355.

After processing the audio input 350 at language processing logic 365, library lookup logic 370 can search the audio library 335 for files using the weighted words, phrases, clauses, etc., from language processing logic 365. Library 335 can include any conventional audio library (e.g., any digital audio source 46 described with respect to FIG. 1), and library lookup logic 370 may include a relational database including relationships between the particular words, phrases, clauses, etc. and audio files 340. Audio library 335 can be locally stored at audio system 10 (FIG. 1) and/or stored at one or more remote or cloud-based servers. Library lookup logic 370 can be continually updated based upon changes in audio library 335 in order to provide accurate, timely associations between the weighted words, phrases, clauses, etc., from language processing logic 365 and audio files 340.

After library lookup logic 370 selects the audio file 340, that audio stream is provided (i.e., rendered) at transducer 215 (FIG. 2) as audio sample 355. In some examples, audio sample 355 can include the introduction to a song or other audio feed (e.g., a sporting event broadcast, an audio file of a movie, interview, documentary, educational programming, etc.), or a portion of such a song or other audio feed selected to represent that song or audio feed (e.g., the chorus of a song).

Additionally, as noted herein, the recommendation engine 310 is configured to provide prompt 360 for feedback about the audio sample 355 along with that audio sample 355. Prompt 360 can include any conventional prompt and/or any prompt described herein, and can be provided via a user interface or other interface (e.g., user input interface 216, FIG. 2), or may include an audio prompt for feedback about audio sample 355.

In various implementations, where prompt 360 is an audio prompt, it can include a phrase such as "How about this song?", "Are you looking for this?", "Do you enjoy this song?" Prompt 360 can include any spoken phrase, word or clause provided at speaker 214, intended to elicit a response from user 320, or can include a displayed prompt (e.g., similar to audio phrase, or with a Yes/No/Maybe or other visual prompt with touch-screen or push-button response capabilities) provided at user input interface 216 (FIG. 2). In contrast to conventional systems, in various implementations, prompt 360 can be provided to the user 320 without an intervening audio input 350, such that user 320 is not required to re-prompt recommendation engine 310 in order to provide feedback. That is, the control system 240 can maintain the at least one microphone 214 (FIG. 2) in a query mode during the providing of the audio sample 355, such that the system actively awaits a response from the user 320. In some implementations, microphone(s) 214 can remain in an optional response mode while providing the audio sample 355. That is, control system 240 can maintain microphone(s) 214 in a listen mode for a set period, with an expectation that user 320 may or may not respond (e.g., with a "Thanks," compliment or other feedback about audio sample 355).

In various implementations, the audio sample 355 is provided through the at least one speaker 214 (e.g., headphone system or speaker system, FIG. 2) at a decibel level ranging between approximately 50-70 decibels (dB). In some cases, prompt 360 is provided at an approximately equal or greater volume as audio sample 355, in order to enhance the chances that user 320 recognizes the prompt and provides useful feedback. In some particular implementations, audio sample 355 is provided (i.e., rendered) at transducer 215 at a first decibel level, then the audio sample 355 is faded out to a reduced decibel level while prompt 360 is provided, and audio sample 355 is then faded in to the original decibel level while recommendation engine 310 awaits a response to prompt 360 at microphone 217 or other interface. In various implementations, the prompt 360 can trail the audio sample 355 or overlap with only a portion of audio sample 355 to allow user 320 to consider the audio sample 355 prior to providing feedback.

With continuing reference to FIGS. 2-4, according to various implementations, recommendation engine 310 can further include feedback logic 375 for receiving and processing feedback 380 from user 320 (process 430, FIG. 4). In some cases, feedback 380 includes negative feedback from user 320 about the audio sample 355 (e.g., "I don't like this song", "No", "Change", "Next" or a similar response to a user interface prompt such as a thumbs-down, "No" vote, etc.). In other cases, feedback 380 includes positive feedback from user 320 about the audio sample 355 (e.g., "Yes", "Good", "Continue" or a similar response to a user interface prompt such as a thumbs-up, "Yes" vote, etc.). In various implementations, user 320 can provide either a verbal response or a physical response to a user interface prompt.

In response to the user 320 providing negative feedback about the audio sample 355, recommendation engine 310 is configured to provide an additional audio sample 355a to user 320 along with an additional prompt 360a for feedback (process 440, FIG. 4). As shown in phantom arrows in FIG. 4, in some cases, where user 320 provides negative feedback about audio sample 355, language processing logic 365 may determine that the process loops back to process 420 (e.g., where user 320 provides specific request such as "No" or "Yes" in response to the additional audio sample 355a), or to process 410 (e.g., where user provides a non-specific request in response to the additional audio sample 355a). In some example implementations, feedback 380 can be used to initiate a dialog for additional feedback from user 320. In these cases, the additional audio sample 355a may not be provided until recommendation engine 310 receives additional feedback from the user 320, e.g., in response to an additional prompt 360a. In some other example implementations, feedback 380 is used to trigger the additional audio sample 355a without requiring additional feedback (or requesting additional feedback, via an additional prompt 360a after initiating the additional audio sample 355a). In these cases, feedback 380 is processed by recommendation engine 310 and additional audio sample 355a is provided back to user 320 based upon that feedback 380 (as well as any other data inputs, e.g., sensor data, described herein) without requiring further dialog to select that additional audio sample 355a. The additional prompt 360a can be provided after initiating the additional audio sample 355a. In still other example implementations, feedback 380 can be used to select and provide an additional audio sample 355a without an additional prompt 360a. In these cases, recommendation engine 310 can use other data (e.g., from profile system 325, audio library 335 and/or sensor system 345) to select additional audio sample 355a and not utilize an additional prompt 360a for feedback. This additional data could include global popularity data, personalized audio history/preference data and/or contextual information, and may provide sufficient confidence to recommendation engine 310 to select additional audio sample 355a without supplying the additional prompt 360a for feedback. In these cases, control system 240 can still maintain microphone(s) 214 in a listen mode for a set period in order to receive any additional feedback 380a about additional audio sample 355a.

In contrast, in response to the user 320 providing positive feedback about the audio sample 355, recommendation engine 310 is configured to continue an audio feed of the audio sample 355 (process 450, FIG. 4). In these cases, the audio sample 355 may be modified to play from the beginning of the particular stream (e.g., beginning of a song, where the sample was taken from a distinct portion of the song), or may continue to play through its entirety unless otherwise modified by the user 320. In various particular implementations, a positive response to the prompt 360 can include a null response (e.g., no verbal command from user 320) after a waiting period (e.g., 10 seconds, 20 seconds).

As shown in FIG. 3, feedback logic 375 is connected with language processing logic 365 and can process feedback 380 and provide that feedback 380 to language processing logic 365 and library lookup logic 370. In some cases, feedback logic 375 can be configured to teach language processing logic 365 and library lookup logic 370 about preferences of user 320, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic 375 can be configured to analyze feedback 380 and enhance future operations of recommendation engine 310. It is further understood that feedback logic 375, library lookup logic 370 and/or language processing logic 365 may be interconnected in such a manner that these components act in concert or in reliance upon one another. For example, while feedback logic 375 is described as analyzing feedback 380, it is understood that language processing logic 365 can be relied upon to process the response from user just as it is used to process the initial non-specific request in audio input 350.

In some particular implementations, recommendation engine 310 is configured to provide an explanation 385 for selection of the audio sample 355 in response to receiving either positive or negative feedback about the audio sample 355 from user 320 (process 460, shown in phantom as optional in FIG. 4). Explanation 385 can include another audio stream, e.g., similar to prompt 360, and may include a phrase such as, "This song was selected because you liked another song by this artist," or "Your friends are listening to this song right now," or "You listened to this soundtrack on your last jog and you exceeded your previous best time." In these cases, user 320 may elect particular explanation settings such that explanations do not overwhelm the experience, e.g., such that explanations are only provided in response to negative feedback, or that explanations are only provided after a plurality of negative feedback responses. Additionally, explanations 385 could include additional prompts (or act as prompts themselves) to allow user 320 to verify that particular selection criteria are relevant to his/her interests. In some particular implementations, recommendation engine 310 and user 320 can engage in a two-way dialog to enhance selection of audio sample(s) 355 in the present scenario as well as to enhance selection of audio samples 355 in future exchanges. In this mixed initiative dialog system, both user 320 and recommendation engine can proactively take control of the conversation during discourse.

As noted herein in contrast to a specific request, e.g., "play Frank Sinatra", or "how tall was Abraham Lincoln?", a non-specific request can include at least one syntactically ambiguous clause and/or at least one fuzzy clause. In some implementations, a "non-specific request" can include at least one of a lexically, phonetically or logically ambiguous clause. For example, a non-specific request could include: "play something relaxing", or "I am feeling tired." The terms "something" and "relaxing" in the first example are indicative of non-specific requests. That is, these terms may do little to narrow search results for music or other audio sources in order to provide a suitable result for the user 320. Additionally, the second example phrase includes ambiguous terminology which may indicate the user 320 wants to feel energized (e.g., wants to hear something up-tempo or motivating), or wants to feel comforted (e.g., wants to hear something mellow or relaxing). In both cases, the request does not positively refer to a sufficiently specific genre of audio (e.g., artist name, song name, etc.) from which to begin narrowing search results. In other cases, the user 320 may ask for a recommendation from recommendation engine 310 with a non-specific request such as, "what music do you recommend right now?" That is, in many examples, the non-specific request includes a request to play a style of music or an open-ended query for a music recommendation.

Conventional processing engines fail to return useful results from such user requests. These conventional processing engines may respond to the above-noted example request with an audio output such as, "I do not understand," or "Could you please specify an artist or song?" In some instances, these conventional processing engines may simply provide a best-guess audio output based upon keywords in the request. For example, these conventional processing engines may detect the word "feeling" or "tired" in "I am feeling tired" and play a song with a title including the term "feeling" (e.g., "More Than a Feeling") or "tired" ("I'm So Tired"). These conventional engines will then essentially go into rest mode and await a further user prompt, which typically requires utterance of a wake word (e.g., "Alexa, . . . ") before taking any action. An example interaction in a conventional system is as follows:

User: "Alexa, play something relaxing."
Alexa: "I do not understand your request", or [Play "Relax" by Frankie Goes to Hollywood].
User: "Alexa, play something mellow."
Alexa: "I do not understand your request", or [Play "Mellow Yellow" by Donovan].

The conventional approach can be frustrating for the user, and requires the user to re-prompt the system at every request. In these senses, the conventional systems do not provide a conversational approach to filtering audio selection, and fall short of user expectations.

In contrast to this conventional approach, recommendation engine 310 can provide the user 320 with a smooth, conversational experience. An example interaction in audio system 10 including recommendation engine 310 is as follows:

User: "Bose, play something relaxing."
Bose: [Play "Nocturnes" by Chopin, based upon analysis of non-specific request user profile(s), and/or sensor data] accompanied with "Are you looking for something like this?"
User: "No, something more modern."
Bose: [Play "All of Me" by John Legend] accompanied with "Is this better?" Bose may also include an explanation such as "This song was chosen based upon the commonality between musical styles of Chopin and John Legend (e.g., piano-based patterns) and the recent release date of 2014."
User: "No, something more folksy."
Bose: [Play "Carolina In My Mind" by James Taylor] accompanied with "Is this what you are looking for?"
User: "Yes," or, "Perfect."

In this example, audio system 10 including recommendation engine 310 can provide conversational-based refinement of search results to enhance the user experience. In particular, where the prompt 360 is provided to the user 320 with the audio sample, the user 320 is more likely to stay engaged with the audio system 10 in refining results. This engagement allows the recommendation engine 310 to learn from user(s) 320 and enhance future experiences. Additionally, by removing the need for additional user-side prompts (e.g., "Alexa . . . " or "Bose . . . "), the dialogue-style interaction reduces the overall time required to find a desired result for the user 320.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A speaker system comprising:
   at least one speaker including an acoustic transducer having a sound-radiating surface for providing an audio output;
   at least one microphone for receiving an audio input from a user; and
   a control system stored in a memory that is coupled with the at least one speaker and the at least one microphone, the control system comprising instructions for execution by a processor, which when executed, cause the processor to:
     analyze the audio input for a non-specific request from the user; and
     provide an audio sample to the user along with a prompt for feedback about the audio sample in response to the non-specific request,
   wherein the control system maintains the at least one microphone in a query mode during the providing of the audio sample,
   wherein the prompt for feedback comprises an audio prompt that is output through the at least one speaker, wherein the query mode comprises an optional response mode, wherein the processor maintains the at least one microphone in the optional response mode for a set period without requiring a wake word, and wherein the audio prompt that is output through the at least one speaker is provided at an equal or greater volume to the user than the audio sample.

2. The speaker system of claim 1, wherein the non-specific request includes at least one syntactically ambiguous clause.

3. The speaker system of claim 1, wherein the non-specific request includes a request to play a style of music or an open-ended query for a music recommendation.

4. The speaker system of claim 1, wherein the instructions further cause the processor to:
   receive negative feedback from the user about the audio sample; and
   provide an additional audio sample to the user along with an additional prompt for feedback about the additional audio sample in response to receiving the negative feedback.

5. The speaker system of claim 4, wherein the negative feedback includes an audio input from the user or a response to an interface prompt.

6. The speaker system of claim 1, wherein the instructions further cause the processor to:
   receive positive feedback from the user about the audio sample; and
   continue an audio feed of the audio sample in response to receiving the positive feedback from the user about the audio sample.

7. The speaker system of claim 6, wherein the positive feedback includes an audio input from the user, a response to an interface prompt or a null response.

8. The speaker system of claim 1, wherein the control system is further coupled with a profile system including a user profile for the user, and the instructions further cause the processor to determine a type of the audio sample based upon the user profile.

9. The speaker system of claim 8, wherein the profile system is located in one of a local server or a cloud-based server.

10. The speaker system of claim 1, wherein the audio sample is provided through the at least one speaker at a decibel level ranging between 50-70 decibels (dB).

11. The speaker system of claim 10, wherein the prompt is also provided through the at least one speaker at an equal or greater volume to the user than the audio sample.

12. The speaker system of claim 1, further comprising a sensor system coupled with the control system, the sensor system configured to detect an environmental condition proximate the at least one speaker, wherein the instructions further cause the processor to:
   receive data about the environmental condition from the sensor system; and
   determine a type of the audio sample based at least in part upon the environmental condition.

13. The speaker system of claim 1, wherein the instructions further cause the processor to select the audio sample based upon at least one of: a syntax of the non-specific request from the user, a profile of the user, a demographic profile of a plurality of users with at least one common attribute with the user or a categorical popularity of the audio sample.

14. The speaker system of claim 1, wherein the instructions further cause the processor to provide an explanation for selection of the audio sample in response to receiving one of positive feedback from the user about the audio sample or negative feedback from the user about the audio sample.

15. The speaker system of claim 1, wherein the non-specific request includes a request for an audio output associated with at least one other user, and wherein the instructions further cause the processor to select the audio sample based upon profile data or activity data about the at least one other user.

16. The speaker system of claim 15, wherein the profile data includes demographic data about the at least one other user, and the activity data includes audio preferences associated with the at least one other user.

17. A computer-implemented method of controlling an audio system configured to provide an audio output, the method comprising:

analyzing an audio input for a non-specific request from a user; and providing an audio sample to the user along with a prompt for feedback about the audio sample in response to the non-specific request, wherein the audio system includes at least one microphone for receiving an audio input from the user, and the method further comprises maintaining the at least one microphone in a query mode during the providing of the audio sample, wherein the prompt for feedback comprises an audio prompt that is output through at least one speaker at the audio system along with the audio sample, wherein the query mode comprises an optional response mode that maintains the at least one microphone in the optional response mode for a set period without requiring a wake word, and wherein the audio prompt that is output through the at least one speaker is provided at an equal or greater volume to the user than the audio sample.

18. The method of claim 17, further comprising:

receiving negative feedback from the user about the audio sample; and providing an additional audio sample to the user along with an additional prompt for feedback about the additional audio sample in response to receiving the negative feedback.

* * * * *